S. MAITLAND.
Bee Hive.
No. 29,799.
Patented Aug. 28, 1860.
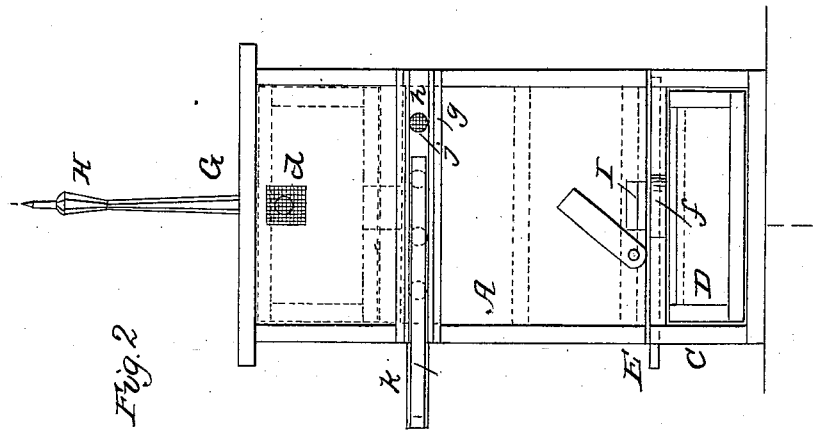
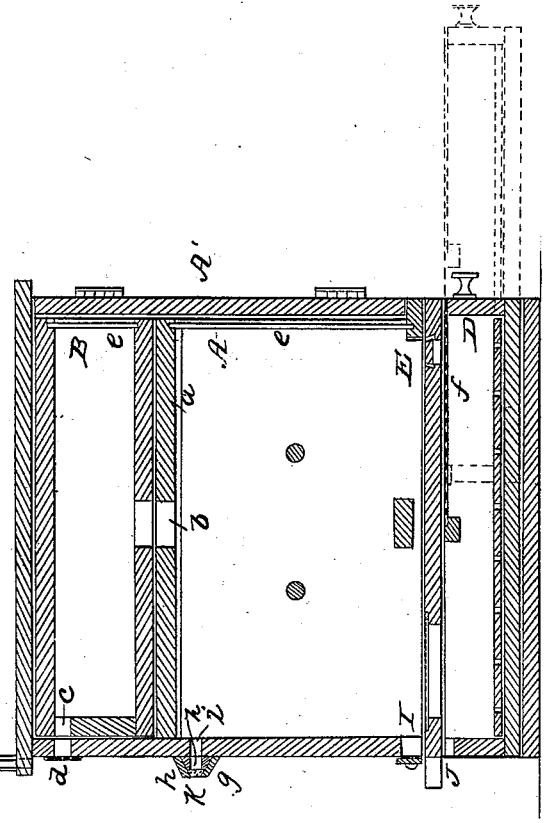

UNITED STATES PATENT OFFICE.

SAMUEL MAITLAND, OF FORT WAYNE, INDIANA.

BEEHIVE.

Specification of Letters Patent No. 29,799, dated August 28, 1860.

*To all whom it may concern:*

Be it known that I, S. MAITLAND, of Fort Wayne, in the county of Allen and State of Indiana, have invented a new and Improved Beehive; and I do hereby declare that the following is a full, clear, and exact description of the same, reference being had to the annexed drawings, making a part of this specification, in which—

Figure 1 is a longitudinal central section of a hive constructed according to my invention; Fig. 2, a front elevation of the same.

Similar letters of reference indicate corresponding parts in the two figures.

This invention relates to means employed for facilitating the swarming of bees and the dividing of swarms and also the proper feeding of the mother colony when necessary.

The invention consists in the employment or use of a swarming pole, queen-bee cells, and feed box, substantially as hereinafter described, whereby the desired end is attained.

To enable those skilled in the art to fully understand and construct my invention I will proceed to describe it.

A represents the main portion or body of the hive which may be of rectangular form and of the usual or any proper dimensions.

B, is a spare-honey box which is fitted in the upper part of the hive directly over the main portion A. The box B, is made separate from the case of the hive and is fitted within it on a horizontal partition $a'$ which forms the top of the main portion A, see Fig. 1. Through the bottom of the box B, and the partition $a'$ apertures $b'$ are made to form a communication between the parts A, and B, and through the end of the case of the hive and the box B, apertures $c'$ are made, said apertures being covered with cloth $d'$. The apertures $c'$ serve as ventilators. One end of both the box B, and the part A of the hive, are provided with a glass $e'$ and the end of the case of the hive opposite the glasses is provided with a door $A'$ by opening which both A, and B, may be inspected, see Fig. 1.

The main portion A, of the hive rests upon a box C, which corresponds in form to the other portions of the hive. Within this box C there is a drawer D, which slides freely in and out of the box C. A portion of this box, about half of it, is covered by a wire cloth F. The other portion is open at the top.

In the bottom of the main part A of the hive there is fitted a slide E, by adjusting which a communication may be formed between the part A of the hive and the drawer D, or the communication cut off as may be desired.

In one end of the case of the hive, the end opposite to that which has the door F, there is attached a horizontal strip $g$, in which a series of holes $h$, are made said holes being in line with holes $i$, which lead into the main part A of the hive. Between the holes $h$ $i$ wire cloth $j$, is interposed, said cloth cutting off the communication between the holes $h$ $i$. The strip $g$, is provided with a slide $k'$, which when closed covers the holes $h$. The holes $h'$ are queen cells and by placing a queen in each cell they will be fed by the bees within, and new swarms may be made or multiplied by dividing the old ones.

G is a swarming pole which is made of wood painted white and provided with a black ball or projection H. The pole G, may be about 10 feet high and the ball or hub H, about 18 inches from the top of the pole. The pole is attached to the top of the case of the hive and may be secured thereto in such a way that it may be readily attached to and removed from the hive. In swarming the ball H serves as a decoy and induces the bees to alight.

The bees within the part A may be fed at any time when necessary by withdrawing the slide E, the drawer D being partially withdrawn as shown in red outline in Fig. 1.

Having thus described my invention what I claim as new and desire to secure by Letters Patent is:

1. The swarming pole G, provided with the ball or hub H, and attached to the hive for the purpose specified.

2. The queen cells $h$, attached to the hive substantially as and for the purpose set forth.

3. The feed drawer D, fitted within the box C, on which the main portion A, of the hive rests and is made to communicate with the part A, when desired by the slide E, substantially as described.

SAMUEL MAITLAND.

Witnesses:
C. P. EDSON,
I. D. CLARK.